United States Patent [19]
Dewey

[11] Patent Number: 5,503,448
[45] Date of Patent: Apr. 2, 1996

[54] STRAP APPARATUS FOR HAULING LARGE OBJECTS

[76] Inventor: Don L. Dewey, 1400 Falcon Dr., Ontario, Oreg. 97914

[21] Appl. No.: 282,325

[22] Filed: Jul. 29, 1994

[51] Int. Cl.⁶ .................................................. B65D 63/18
[52] U.S. Cl. ........................................... 294/152; 294/157
[58] Field of Search ............................. 294/74, 149–157, 294/165, 170

[56] References Cited

U.S. PATENT DOCUMENTS

| | | | |
|---|---|---|---|
| 734,934 | 7/1903 | Palmer | 294/150 |
| 799,793 | 9/1905 | Kinsella | 294/155 |
| 946,850 | 1/1910 | Tabler | 294/149 |
| 1,847,501 | 3/1932 | Stahler | 294/157 |
| 3,214,072 | 10/1965 | Brown | 294/152 |
| 3,559,853 | 2/1971 | Strassman | 294/149 X |
| 4,553,780 | 11/1985 | Strachan | 294/152 |
| 4,881,684 | 11/1989 | Chinman | 294/152 X |
| 5,102,178 | 4/1992 | Staats | 294/152 |

*Primary Examiner*—Johnny D. Cherry
*Attorney, Agent, or Firm*—H. Gordon Shields

[57] ABSTRACT

Strap apparatus for carrying objects includes a basic "X" configuration of a strap with strap elements extending outwardly from the basic "X". The "X" portion of the strap apparatus is disposed at the bottom of an object to be carried and the outwardly extending straps are disposed at the sides of the object. The outer ends of the straps comprise carrying handles. Two or more people, depending on the weight of the object to be carried, may hold onto the handles to carry any object.

9 Claims, 1 Drawing Sheet

U.S. Patent
Apr. 2, 1996
5,503,448
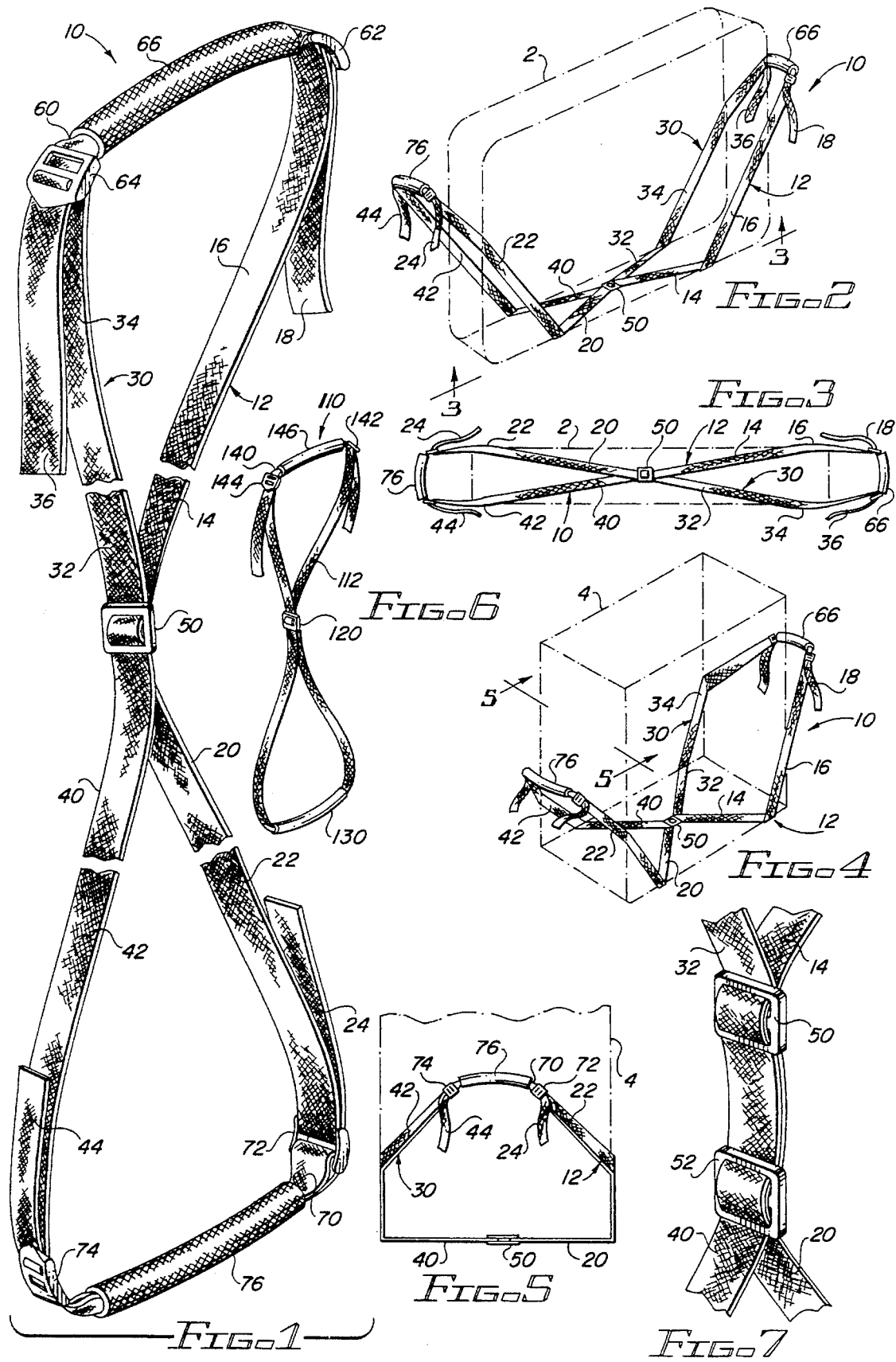

STRAP APPARATUS FOR HAULING LARGE OBJECTS

BACKGROUND OF THE INVENTION

1. Field of the Invention

This invention relates to straps for carrying elements or objects and, more particularly, to strap apparatus which may be disposed to an object to support the object for carrying by two individuals.

2. Description of the Prior Art

For moving heavy objects, there are well known dolly elements typically of two different types. One type of dolly apparatus is simply a platform having four supporting wheels. The wheels typically all are casters to allow the dolly to move in virtually any direction with ease. An apparatus to be moved is placed on the dolly and the dolly and apparatus is then moved.

A second type of dolly apparatus is typically known as a hand truck. The hand truck type of dolly apparatus generally includes a pair of wheels and a plate disposed between the two wheels with a handle assembly extending generally perpendicular to the plate. The hand truck type of dolly apparatus may include straps to fasten an object to the plate and to the carrying handles for moving. There are various other embodiments involved with the hand truck type of apparatus.

Neither of the two above described dollies are generally satisfactory for moving all types of objects. For example, neither of them may be used conveniently to move a mattress or a relatively large object, such as a chest of drawers. Such objects as mattresses and chests of drawers are generally simply moved by two or more people holding on to them in some manner.

The apparatus of the present invention comprises a strap apparatus in which a basic "X" configuration of the straps is used at the bottom of the object to be transported and the strap elements extending from the basic "X" move outwardly and along the sides of the object to be transported. The "ends" of the strap elements comprise carrying handles. Using the strap apparatus objects of large sizes or irregular sizes may be carried by two or more people easily and efficiently.

SUMMARY OF THE INVENTION

The invention described and claimed herein comprises strap elements including a basis "X" configuration of a strap designed to be disposed at the bottom center of an object to be transported. The strap elements outwardly from the basic or bottom "X" portion extend outwardly and are disposed at the sides of the object to be transported. The outwardly extending straps meet at a handled portion. Buckles are used to allow the strap apparatus to be appropriately sized for the object being carried. Carrying handles at the ends of the straps allow an object to be carried by two or more people.

Among the objects of the present invention are the following:

To provide new and useful strap apparatus for carrying objects;

To provide new and useful strap apparatus having a basic "X" configuration disposed at the bottom of an object to be carried;

To provide new and useful strap apparatus having strap elements disposed at the bottom and sides of an object to be carried; and To provide new and useful strap apparatus to enable objects of various configurations to be carried by two or more people.

BRIEF DESCRIPTION OF THE DRAWING

FIG. 1 is a perspective view of the apparatus of the present invention.

FIG. 2 is a perspective view of the apparatus of the present invention in a use environment.

FIG. 3 is a view taken generally along line 3—3 of FIG. 2.

FIG. 4 is a perspective view of the apparatus of the present invention in a second use environment.

FIG. 5 is an end view taken generally along line 5—5 of FIG. 4.

FIG. 6 is a top plan view of an alternate embodiment of the present invention.

FIG. 7 is a partial perspective view of an alternate embodiment of the present invention.

DESCRIPTION OF THE PREFERRED EMBODIMENT

The carrying strap apparatus 10 includes, in general, two straps, including a first strap 12 and a second strap 30. The first strap 12 is configured into several different portions, which portions vary, depending on the item being carried, such as will be discussed below in conjunction with FIGS. 2, 3, 4, and 5. Essentially, the first strap 12 includes two base portions, including a first base portion 14 and a second base portion 20. The base portions 14 and 20 are adjacent to each other, and separated by a center element 50, which may be a buckle.

Extending outwardly from the base portions 14 and 20 are side portions 16 and 22, respectively. The side portions 16 and 22 extend to buckles 62 and 72, respectively. The buckles 62 and 72 are used to adjust the length of the strap 12. From the buckle 62 outwardly, there is an end strap portion 18. From the buckle 72 outwardly, there is an end strap portion 24.

The strap 30 is substantially identical to the strap 12. The strap 30 includes two base portions, a base portion 32 and a base portion 40. Outwardly from the base portions 32 and 40 are side portions 34 and 42, respectively. The side portion 34 extends to a buckle 64, while the side portion 42 extends to a buckle 74. Outwardly from the buckles 64 and 74 are end strap portions 36 and 44, respectively.

The effective lengths of the straps 12 and 30 can be adjusted or varied at the buckles 62, 72 and 64, 74, respectively. The effective lengths of the straps vary with the size and configuration of the load to be carried. The use of the four buckles enhances the ability to easily and quickly adjust the lengths of the straps.

The base portions 32 and 40 are separated by the buckle 50. Thus, essentially, the buckle 50 comprises the center of the base portions of the strap 12 and the strap 30. The straps extend outwardly from the buckle 50 in an "X" configuration. The differentiation between the base portions and the side portions of the straps depends, as indicated above, on the size and configuration of the load being carried.

The buckles 62 and 64 are appropriately secured at opposite ends of a handle portion 60. The handle portion 60 may include a covering or grip 66.

The buckles 72 and 74 are appropriately secured to a handle portion 70. The handle 70 may be covered by a covering or grip 76. The coverings or grips 66 and 76 may be used, if desired, to enhance the carrying capability, or the hand grip, of the persons using the carrying strap apparatus 10.

FIGS. 2 and 3 illustrate the use of the carrying strap apparatus 10 in carrying a mattress 2, which, as is well known, is a rather awkward load to be carried. FIG. 2 is a perspective view of the strap apparatus 10 disposed about the mattress 2, with the mattress 2 being shown in dash dot line. FIG. 3 is a bottom view of the strap apparatus 10 and the mattress 2. For the following discussion, reference will be made primarily to FIGS. 2 and 3.

The center element 50, which centers the base portions of the straps 12 and 30, is located at about the bottom center midpoint of the mattress 2, with the mattress 2 disposed in generally a vertical orientation. The base strap portions 14, 20, and 32, 40 then extend outwardly from the center element 50. The side portions 16, 22 of the strap 12 and side portions 34, 42 of the strap 30 then extend upwardly along the sides of the mattress 2. The handle portions 60 and 70, or their coverings or grips 66 and 76, respectively, are then grasped by users of the strap apparatus 10 to carry the mattress 2.

The overall length of the straps 12 and 30 may be adjusted at the buckles 60 and 62 and 72 and 74, respectively, to provide the users with a convenient length of the strap apparatus 10 for carrying the object, whatever its size.

The mattress 2 is relatively floppy and is an awkward size for carrying. With the strap apparatus 10, the base portions of the straps are disposed at the bottom of the mattress when the mattress is in the vertical position, as illustrated in FIGS. 2 and 3. The side strap portions then extend to the handles along the side of the mattress 2 so that the weight of the mattress itself helps to stabilize the mattress within the side strap portions.

A differently configured load is illustrated in FIGS. 4 and 5. A box 4, of a generally rectangularly configuration, is shown disposed within the strap apparatus 10. FIG. 4 is a perspective view of the box 4 within the carrying strap apparatus 10, and FIG. 5 is an end view of the box 4 with the strap apparatus 10 secured thereto. For the following discussion, reference will primarily be made to FIGS. 4 and 5.

As indicated above, the center element or buckle 50 is centered at the bottom of the load to be carried, namely the box 4 in FIGS. 4 and 5. The base strap portions 14 and 20 of the strap 12 extend outwardly from the buckle 50 to one side extend outwardly from the buckle 50 to the opposite side of the of the box 4. The base portions 32 and 40 of the strap 30 box 4. The side strap portions 16, 22 of the strap 12 and the side strap portions 34, 42 of the strap 30 then extend upwardly along the sides of the box 4 to the end handles 60 and 70.

Once again, the weight of the box 4 helps to stabilize the box within the frame defined by the straps 12 and 30. Since the size and configuration of the box 4 differs substantially from the mattress 2, the size of the base portions of the straps and the side portions of the straps vary from the configurations of FIGS. 2 and 3 to that of FIGS. 4 and 5.

Again, as indicated above, the lengths of the straps may be adjusted at the end buckles to conform to whatever size load is to be carried and the size of the individuals carrying the load by the strap apparatus 10.

If desired, the carrying strap apparatus of the present invention may be made of a single length of strap by using two buckles for length adjustment rather than the four buckles illustrated in FIGS. 1–5. The adjustment of the length of the strap, or the strap portions, can be accomplished through the adjustment of the two buckles at one end handle. The handle at the opposite end of the carrying apparatus may be adjusted along the strap, as desired, and the location of a center buckle may also be adjusted, as desired.

The use of the four buckles and two straps, with two separate handle portions, is perhaps more convenient than the use of the single strap because the center buckle need not be adjusted, but may remain as originally, centrally located. Rather, only the buckles at the handle portions need to be adjusted. This is illustrated in FIG. 6.

FIG. 6 comprises a top view of an alternate carrying strap apparatus 110 which utilizes only a single strap with two buckles. The carrying strap apparatus 110 includes only a single strap 112 which is laid out in a FIG. 8 configuration with a center element 120, which may be a buckle, defining the center of the base portion of the strap apparatus 110. A handle 130 is disposed at one end, the closed loop end, of the strap 112, while a handle portion 140 is disposed at the open end of the strap 112. The handle 140 is appropriately secured to two buckles, a buckle 142 and a buckle 144. A covering or grip 146 is disposed on the handle portion 140 between the buckles 142 and 144.

The overall length of the strap 112 may be adjusted at the buckles 142 and 144. As the length of the strap between the buckles is varied, the center buckle 120 will be adjusted so the two loops, or the distances between the buckle 120 and the handles 130 and 140 are essentially equal.

It is immediately obvious that even the use of the two end buckles 142 and 144 may be obviated by use of only a single end buckle, if desired. The single end buckle strap apparatus would necessitate the changing of the location of both handle coverings or grips and the center buckle each time the length of the single strap is adjusted. Such variation or embodiment may be the least expensive, but probably the most inconvenient to use. The two strap apparatus, with four end buckles plus the center element, such as the strap apparatus 10 of FIGS. 1–5, is probably the easiest to use but the most expensive to manufacture.

Moreover, the use of a second center element 52, which may be a buckle, such as shown in FIG. 7, may be advantageous in certain circumstances. FIG. 7 comprises a fragmentary perspective view of the center portion of the strap apparatus 10 utilizing two center buckles. For carrying items without substantial sides, such as desks and various kinds of furniture, the double center buckle embodiment presents substantial advantages.

The two center elements 50 and 52 are spaced apart relatively close to the ends of the item to be carried, and the side portions of the strap apparatus, such as the portions 16, 34 and 22, 42 are then disposed outwardly of the item to be carried. This configuration provides stability for conveniently carrying items which are typically awkward to carry due to the lack of good hand holds and/or the lack of substantial sides.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Strap apparatus for carrying a load comprising in combination:

a strap having a length and configuration to provide two generally elongated loops;

a first buckle at a juncture of the two loops to define a center portion of the strap apparatus and to be disposed beneath the load to be carried;

the loops having handle portions remote from the center portion for carrying the load; and a second buckle at one of the handle portions for varying the length of the strap.

2. The apparatus of claim 1 in which the strap includes a third buckle at the one of the handle portions and spaced apart from the second buckle for varying the length of the strap, the one handle portion being defined between the second and third buckles.

3. The apparatus of claim 1 in which the loops each have base portions disposed beneath the load and side portions extending from the base portions to the handle portions.

4. Strap apparatus for carrying a load comprising in combination:

a first strap having a length and a first end and a second end;

a second strap, having a length and a first end and a second end;

a first handle portion connecting the first ends of the first and second straps;

first and second buckles connected to the first and second straps at the first handle portion for adjusting the length of the first and second straps;

a second handle portion connecting the second ends of the first and second straps;

center element means secured to the first and second straps between the first and second handle portions to be disposed beneath the load to be carried and dividing the first and second straps into first and second carrying portions.

5. The apparatus of claim 4 in which the center element means comprises a bottom center element to be disposed beneath the load.

6. The apparatus of claim 4 in which the center element means includes a first center element and a second center element spaced apart from each other.

7. The apparatus of claim 4 in which the first and second carrying portions of the first and second straps each include base strap portions disposed beneath the load and side strap portions extending from the base strap portions to the handle portions to help stabilize the load as the load is being carried.

8. The apparatus of claim 4 in which the second handle portion has buckles connected to the first and second straps for adjusting the length of the first and second straps at the second ends of the straps.

9. The apparatus of claim 4 in which the center element means comprises a buckle connecting together the first and second straps beneath the load to be carried.

* * * * *